US006536039B2

(12) United States Patent
Sanford

(10) Patent No.: US 6,536,039 B2
(45) Date of Patent: Mar. 18, 2003

(54) SOFTWARE FOR SEAMLESS INTERCONNECTIVITY BETWEEN ACTIVE PROGRAM MODULES ON INTEGRATED ARRANGEMENT OF CD DRIVE, DATA SERVER, AND PC HARD DISK DRIVE

(75) Inventor: Jesse Lon Sanford, Mountain View, CA (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/220,411

(22) Filed: Dec. 24, 1998

(65) Prior Publication Data

US 2002/0073414 A1 Jun. 13, 2002

(51) Int. Cl.$^7$ ................................................. G06F 9/45
(52) U.S. Cl. ....................................... 717/173; 717/163
(58) Field of Search ................................ 717/111, 173, 717/162, 163; 709/331

(56) References Cited

U.S. PATENT DOCUMENTS

| | | | | |
|---|---|---|---|---|
| 5,506,984 A | * | 4/1996 | Miller | 707/10 |
| 5,574,898 A | * | 11/1996 | Lebalang et al. | 707/1 |
| 5,644,782 A | * | 7/1997 | Yeates et al. | 710/10 |
| 5,668,592 A | * | 9/1997 | Spaulding, II | 725/134 |
| 5,764,908 A | * | 6/1998 | Shoji et al. | 707/217 |

(List continued on next page.)

OTHER PUBLICATIONS

Doyle et al., Microsoft Press Computer Dictionary, 1994, Microsoft Press 2nd ed., p. 137–138.*
Li et al., Integrated System for Developing Intelligent Electronic Standards Dook with Internet Capability, IEEE, p. 115–121, Aug. 1999.*
Bob Mack, Help and Tips for Using the CD–ROM, ACM, p. 1–3, Apr. 1995.*
U.S. patent application Ser. No. 08/574,419, Concepcion et al., filed Dec. 15, 1995.

*Primary Examiner*—Tuan Q. Dam
*Assistant Examiner*—John O. Chavis
(74) *Attorney, Agent, or Firm*—Haverstock & Owens LLP

(57) ABSTRACT

The software program provides a unique arrangement and integration of CD drive, data server, and PC hard disk drive technologies. The program provides open-ended, flexible, and timely updating of software programs and content for users at a remote site because the user can download individual updated program modules as needed from a designated information site through a data server to a PC hard disk drive during a program run. Therefore, the user is not required to download the updated program, await the next release of a CD containing the updated program, or use the updated program directly on a designated information site. In addition to the program modules on the CD, the user can use downloaded updated program modules from either the current or a previous program run. The updated program modules are either replacements for those on the CD or additional program modules to the entire program.

The program includes linking software, such that each of the program modules on both the CD and the PC hard disk drive contains an identical yet independent software interface that allows interconnecting to all other program modules. Because the user may also download updated program modules from the designated information site to the PC hard disk drive as needed during a program run, the present invention provides seamless interactivity between program modules on the CD, downloaded program modules on the PC hard disk drive, and replacement or additional program modules at the designated information site.

16 Claims, 2 Drawing Sheets

U.S. PATENT DOCUMENTS

| | | | |
|---|---|---|---|
| 5,809,251 A | * | 9/1998 | May et al. .................. 709/223 |
| 5,832,263 A | * | 11/1998 | Hansen et al. .............. 709/301 |
| 5,931,906 A | * | 8/1999 | Fidelbus, Jr. et al. ....... 709/217 |
| 5,974,454 A | * | 10/1999 | Apfel et al. ................ 709/221 |
| 6,012,130 A | * | 1/2000 | Beyda et al. ............... 711/173 |
| 6,035,423 A | * | 3/2000 | Hodges et al. ................ 714/38 |
| 6,041,360 A | * | 3/2000 | Himmel et al. ............. 709/245 |
| 6,070,012 A | * | 5/2000 | Eitner et al. .................. 717/12 |
| 6,125,388 A | * | 9/2000 | Reisman ..................... 709/218 |
| 6,128,652 A | * | 10/2000 | Toh et al. ................... 709/219 |
| 6,298,481 B1 | * | 10/2001 | Kosaka et al. ............. 717/162 |

* cited by examiner

SOFTWARE FOR SEAMLESS INTERCONNECTIVITY BETWEEN ACTIVE PROGRAM MODULES ON INTEGRATED ARRANGEMENT OF CD DRIVE, DATA SERVER, AND PC HARD DISK DRIVE

FIELD OF THE INVENTION

The present invention relates to the field of software programs. More particularly, the invention relates to the field of software programs for displaying information and content which is displayed electronically which either or both periodically need to be updated from a remote site.

BACKGROUND OF THE INVENTION

For software programs and content that periodically need to be updated with replacement or additional modules from a remote site, typically the means for accessing the replacement or additional modules by these users is inadequate, mainly due to limitations of software distribution. One typical means for distributing an updated software program and/or content to a remote site is by distribution of a new compact disc, CD. Another typical means for distributing an updated software program and/or content to a remote site is to make the software available on a designated information site, such as an Internet web site, accessible through a data server.

If distribution of the updated software program and/or content is done by means of a new CD, the new CD typically contains the entire software program and/or content including the replacement or additional modules. However, the CD as a storage device is typically outdated by rapidly changing information and the need to update more quickly.

If distribution of the updated software program and/or content is done by making the software available on a designated information site, typically the user can access the updated software program and/or content through a data server in one of two ways. The user can use the updated software program and/or content by direct interactivity between the user's personal computer, PC, and the designated information site. However, due to public domain Internet bandwidth limitations, typical software methods using current data handling techniques fall short of efficiency. Thus, direct interactivity, especially in highly data-dense simulation training or informational interaction environments usually requires high speed communications in both directions between the Server and the user, limiting the usefulness of the downloaded data because it cannot pass in a timely manner using these current techniques. Alternatively, the user can download the updated software program and/or content from the designated information site to the user's PC hard disk drive, then the software can be used on the PC hard disk drive. Internet bandwidth limitations also cause downloads of the updated software program and/or content to be a slow process. Furthermore, downloads of the updated software program and/or content decrease efficiency of the updated software program and/or content because the user must make the extra step of downloading the updated software program and/or content before using the updated software program and/or content.

A software program is needed that provides an open-ended, flexible, and timely means for supplying updated software program and/or content modules to users at a remote site. More specifically, a software program is needed that provides a unique arrangement and integration of CD drive, data server, and PC hard disk drive technologies for seamless interactivity between program modules on the CD, downloaded program modules on the PC hard disk drive, and replacement or additional program modules and/or content at the designated information site.

SUMMARY OF THE INVENTION

The software program of the present invention provides a unique arrangement and integration of CD drive, data server, and PC hard disk drive technologies. The program provides a timely means for supplying an updated software program and/or content to users at a remote site. The user can download individual updated program modules and/or content, instead of an entire software program or complete content, from a designated information site through a data server to a PC hard disk drive during a program run. Also, using the program by downloading individual updated program modules as needed during a program run can be done in a more timely manner than using the program on the designated information site by direct interactivity between the user's PC and the information site.

The present invention is open-ended and flexible because the user is not required to download updated program modules before the program run in order to use the updated program modules. The user can download the updated program modules as needed during the program run. Also, the user can run downloaded program modules from either the current or a previous program run. Furthermore, accessing updated program modules from the designated information site is more flexible than awaiting the next release of a CD containing the entire updated progam because each updated program module can separately be made available to the user when completed.

The updated program modules available on the designated information site are either replacement modules for or additional modules to the program modules residing on the CD. When the user chooses to run one of the finite set of program modules available on the CD, the program first checks whether the program module exists on the PC hard disk drive. If the program module exists on the PC hard disk drive, then the program module is a replacement program module for the program module on the CD, and the program runs the program module residing on the PC hard disk drive. If the program module does not exist on the PC hard disk drive, then the program runs the program module residing on the CD.

If the user chooses to add a new program module, instead of choosing one of the finite set of program modules on the CD, the user can then either choose one of the listed program modules already downloaded to the PC hard disk drive or choose to download a new program module from the designated information site through the data server to the PC hard disk drive. If the user chooses to download a new program module, the program runs a call-up browser to link to the designated information site. Most likely, the designated information site is a predetermined Internet Web site. Only the new program module(s) will need to be downloaded from the Internet Web site. The original program will include the capability to accept and operate upon additional program modules which were not included in the originally distributed program. The new program module will be run from the PC hard disk drive.

The present invention inscludes linking software, such that each of the program modules on both the CD and the PC hard disk drive contains an identical yet independent software interface that allows interconnecting to all other modules. The user may go back and forth through all modules, new and old, via a common screen by choosing a new program module, by clicking on links, or by using predesignated keystrokes, such as ALT tab.

The user may download updated program modules from the designated information site to the PC hard disk drive as needed during a program run. The user may also use linking software to move between program modules on the CD and PC hard disk drive. Therefore, the present invention provides seamless interactivity between program modules on the CD, downloaded program modules on the PC hard disk drive, and replacement or additional program modules on the designated information site.

DETAILED DESCRIPTION OF THE PREFERRED EMBODIMENT

The preferred embodiment of the present invention is developed for providing training, and in particular for representatives to a customer base. As new training modules are developed, it is desireable to provide those modules to the field as seamlessly as possible. New modules can be developed as part of routine program development, as new products are developed for which the field needs additional training or in response to particular problems that customers discover with existing products.

Figure 1:
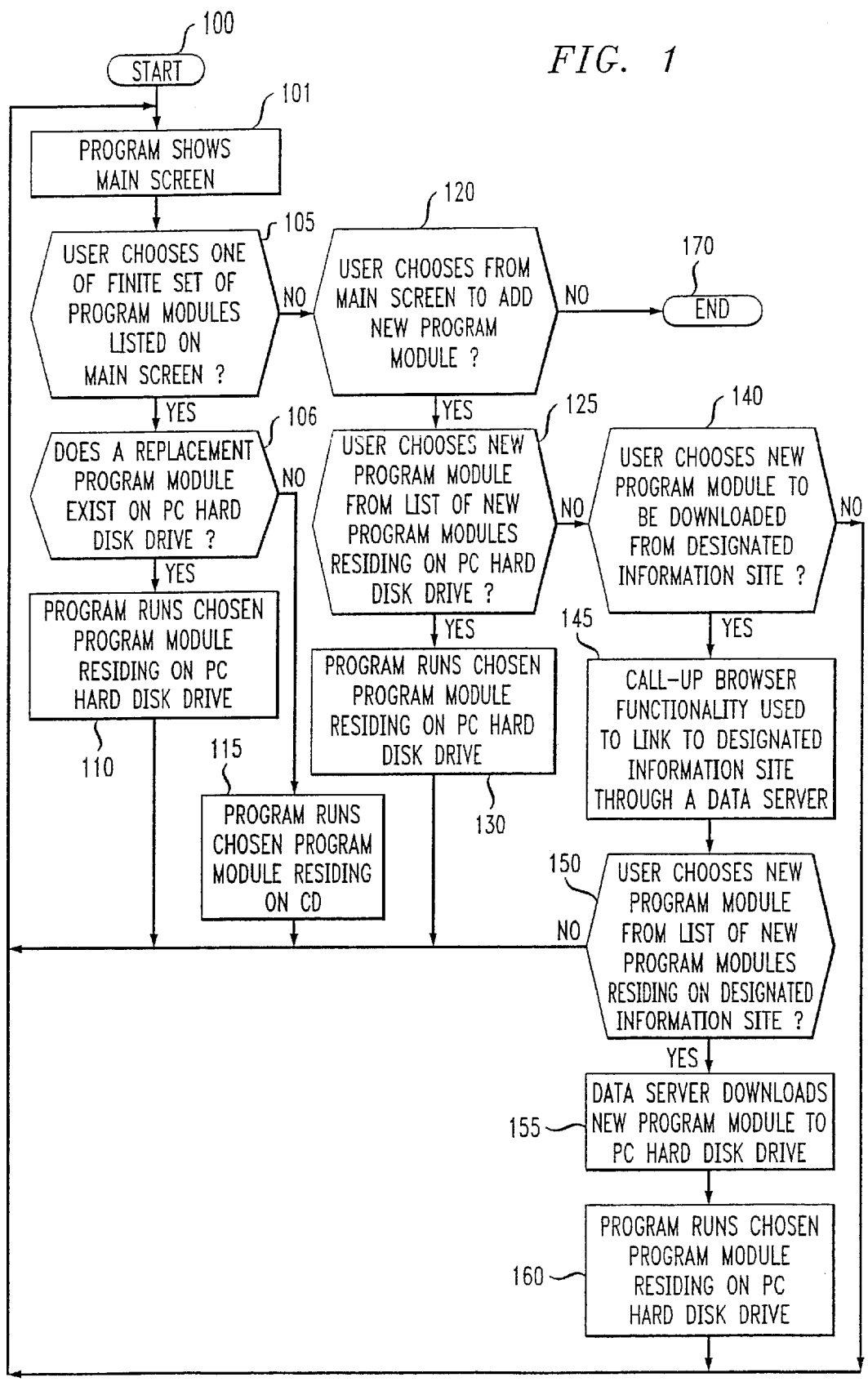
FIG. 1 illustrates a flow diagram for a software program for seamless interconnectivity between active program modules and/or content on an integrated arrangement of CD drive, data server, and PC hard disk drive.

FIG. 1 illustrates a flow diagram for a software program for seamless interconnectivity between active program modules and/or content on an integrated arrangement of CD drive, data server, and PC hard disk drive. For purposes of this disclosure a program module is used to describe both algorithms, content or both. The program runs both program, modules on the CD and updated program modules on the PC hard disk drive. These updated program modules include replacement and additional program modules downloaded from a designated information site through the data server to the PC hard disk drive. Replacement program modules are used in place of the corresponding program modules residing on the CD. Additional program modules are used in conjunction with the program modules residing on the CD. The program flow moves from a start state 100 to an end state 170.

From the main screen of the program 101, the user can use program modules, reuse program modules, or end the program. The CD includes a finite set of program modules, which the main screen presents to the user. The user may either choose one of the finite set of program modules 105 or choose to add a new program module 120. If the user makes neither choice, the program ends 170.

If the user chooses one of the finite set of program modules listed on the main screen 105, the program determines whether the chosen program module should be run from the CD or from the PC hard disk drive. The finite set of program modules listed on the main screen reside on the CD. However, if the chosen program module also exists on the PC hard disk drive, the program module on the PC hard disk drive is a replacement program module for the original program module residing on the CD. One or more of the finite set of program modules on the CD may be replaced by replacement program modules. Replacement of one of the finite set of program modules on the CD occurs by downloading a replacement program module from the designated information site through the data server to the PC hard disk drive. The replacement occurs during either the current program run or a previous program run. Program modules downloaded during both the current and previous program runs can be used during the current program run.

If a replacement program module for the chosen program module exists on the PC hard disk drive 106, then the program runs the chosen program module residing on the PC hard disk drive 110. If a replacement program module does not exist for the chosen program module, the program runs the chosen program module residing on the CD 115. The user may then run another program module from either the CD or the PC hard disk drive from the main screen 101.

From the main screen, if the user does not choose one of the finite set of program modules listed on the main screen 105 and instead chooses to add a new program module 120, the program will present the user with a list of new program modules downloaded to the PC disk drive during either the current or a previous program run. The program will also present the choice of downloading a new program module from the designated information site through the data server. Most likely, the designated information site would be a predetermined Internet Web site. Alternatively, the program could be conditioned to directly make a modem connection to a host machine that maintains update modules. If one or more new program modules were previously downloaded to the PC disk drive, and if the user chooses one of these listed new program modules residing on the PC hard disk drive 125, the program runs the chosen program module from the PC hard disk drive 130. The user may then run another program module from either the CD or the PC hard disk drive from the main screen 101.

If the user does not choose one of the listed new program modules residing on the PC hard disk drive 125 and instead chooses to download a new program module from the designated information site 140, the program will then run a call-up browser for linking to the designated information site through the data server 145. If one or more new program modules are available on the designated information site, and if the user chooses one of these listed new program modules residing on the designated information site 150, the data server downloads the chosen program module from the designated information site to the PC hard disk drive 155. The program then runs the newly downloaded replacement or additional program module from the PC hard disk drive 160. The user may then run another program module from either the CD or the PC hard disk drive from the main screen 101.

If the user chooses neither one of the listed new program modules residing on the PC hard disk drive 125 nor a new program module to be downloaded from the designated information site 140, the program will return to the main screen 101. Similarly, if the user's PC was linked to the designated information site, and the user did not choose a new program module from the list of new program modules residing on the designated information site 150, the program will return to the main screen 101.

The program is run from a CD, after the CD is operatively placed into the CD drive of the PC. The PC also includes a hard disk drive and means for connecting to a data server. The software program on the CD includes a finite set of program modules from a first-product release. Also included on the CD are the library files, for audio and graphics, and runtime executables for running the CBT based programs. Each program module connects with the library files and the runtime executables. Besides these runtime software files, the CD also includes reference PDF files for user perusal, as well as call-up browser functionality for linking to the designated information site through the data server.

Figure 2:
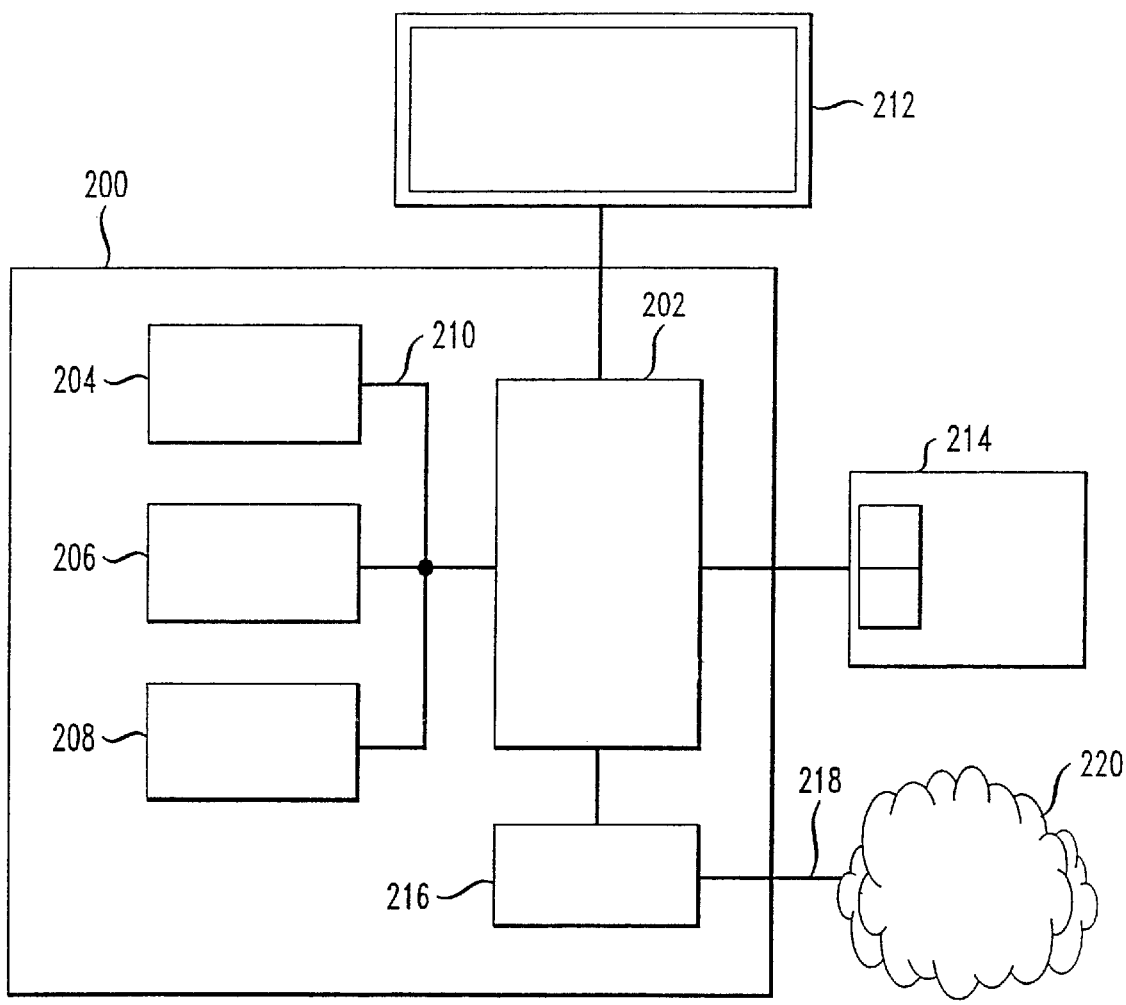
FIG. 2 shows a block diagram for an exemplary system for implementing the present invention.

FIG. 2 shows an exemplary system for implementing the present invention. A PC 200 includes a processor 202 for controlling the several operations of the present invention. The processor is coupled to random access memory 204, a hard disk 206 and a CD drive 208 via an internal bus 210. The processor 202 is also coupled to control a display 212. A cursor on the display 212 is controlled through the processor 202 by a cursor control device 214 such as a mouse. A communications device 216 such as a modem allows the PC 200 to communicate via a communications network 218 with a remote information source 200 such as an Internet Web site 220. The Internet Web site could also be a remote host computer.

The hard disk 206 and CD 208 are used to store operative programs and data for the operation of the present invention. This stored information can be runtime executables, library files, PDF files, a call-up browser functionality, and program modules.

The program is efficient in general because the runtime software, responsible for running all modules, resides on the CD, and the individual program modules are kept down to about 2 MB, uncompressed. A smaller portion of the runtime software can be kept on the PC hard disk drive. The amount of run time software on the CD versus PC hard disk drive will vary for purposes of improving startup and access times.

The present invention allows program updating capabilities from the designated information site through the data server in a timely manner. Because the user can download individual updated program modules, instead of an entire software program, from the designated information site, over-dependence on data server usage is bypassed. Downloading individual program modules during a program run deletes the extra step of downloading the entire updated software program before running the updated software program. Also, downloading individual modules from the information site as needed can be done in a more timely manner than using an updated software program on the designated information site by direct interactivity between the user's PC and the designated information site.

The present invention is open-ended and flexible because the user is not required to download updated program modules before a program run in order to use the updated program modules. The user can download the updated program modules as needed during the program run. Also, the user can run downloaded program modules from either the current or a previous program run. Furthermore, accessing updated program modules from the designated information site is more flexible than awaiting the next release of a CD containing the entire updated progam because each updated program module can separately be made available to the user when completed.

The present invention includes linking software, such that each of the downloaded program modules and the program modules on the CD contains an identical yet independent software interface that allows seamless interconnecting to all other program modules. The linking software, a jumpFile Authorware function, allows the user to move between program modules via the main screen and is employed by choosing a new program module or an original one. A jumpFile link contained in each module also allows the user to move between program modules and is employed by clicking the link. The user may also use predesignated keystrokes, such as ALT tab, to move between the program modules.

Thus, the program provides a unique arrangement and integration of CD drive, data server, and PC hard disk drive technologies. The program provides an open-ended, flexible, and timely means for supplying updated software program modules to users at a remote site. The user may download updated program modules from the designated information site to the PC hard disk drive as needed during a program run. The user may also use linking software to move between program modules on the CD and PC hard disk drive. Therefore, the present invention provides users with seamless interconnectivity between program modules on a CD, downloaded program modules on a PC hard disk drive, and any replacement or additional program modules on the designated information site.

The unique arrangement of integrating CD drive, data server, and PC hard disk drive can be utilized in many different types of programs, such as training or informational programs. The arrangement provides an open-ended, flexible, and timely means to update training and information for people remote to centralized training or information facilities.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications can be made in the embodiment chosen for illustration without departing from the spirit and scope of the invention. Specifically, it will be apparent to one of ordinary skill in the art that the device of the present invention could be implemented in several different ways and the apparatus disclosed above is only illustrative of the preferred embodiment of the invention and is in no way a limitation.

What is claimed is:

1. A method of operating a software program on a computer having a CD drive, a PC hard disk drive, and access to a data server, wherein the software program is stored as a plurality of preprogrammed modules on a CD; the method comprising the steps of:

a. periodically linking to a designated information site through the data server;

b. downloading a module from the designated information site through the data server to the PC hard disk drive forming either a replacement or an additional module on the PC hard disk drive; and c. concurrently running the software program using the preprogrammed modules on the CD which have not been replaced, the downloaded replacement modules on the PC hard disk drive, and the downloaded additional modules on the PC hard disk drive while downloading the replacement and additional modules from the designated information, site through the data server to the PC hard disk drive.

2. A method according to claim 1, wherein the CD is preprogrammed with runtime executables and further wherein the step of running the software program comprises using the runtime executables.

3. A method according to claim 1, wherein the CD is preprogrammed with library files and further wherein the step of running the software program comprises using the library files.

4. A method according to claim 1, wherein the CD is preprogrammed with PDF files and further wherein the step of running the software program comprises using the PDF files.

5. A method according to claim 1, wherein the CD is preprogrammed with a call-up browser functionality and further wherein the step of periodically linking comprises using the call-up browser functionality.

6. A method according to claim 1, wherein the CD is preprogrammed with program modules and further wherein the step of running the software program comprises using the program modules.

7. A method according to claim 1, wherein the CD is preprogrammed with runtime executables, library files, PDF files, a call-up browser functionality, and program modules and further wherein the step of running the software program comprises at least one of:
   a. runtime executables;
   b. library files;
   c. PDF files;
   d. a call-up browser functionality; and
   e. program modules.

8. An apparatus for automatically providing seamless interconnectivity between active program modules on each of a CD and a PC hard disk drive comprising:
   a. a PC having a CD drive, a hard disk drive, and means for connecting to a data server from the PC;
   b. a CD having a plurality of preprogrammed modules, which is operatively placed is into the CD drive of the PC;
   c. means for downloading replacement and additional modules from a designated information site through the data server to the PC hard disk drive; and
   d. means for concurrently running a software program using the preprogrammed modules on the CD which have not been replaced, the downloaded replacement modules on the PC hard disk drive and the downloaded additional modules on the PC hard disk drive while downloading the replacement and additional modules from the designated information site through the data server to the PC hard disk drive.

9. The apparatus according to claim 8, wherein the modules on the CD which have not been replaced, downloaded replacement modules on the PC hard disk drive, and downloaded additional modules on the PC hard disk drive comprise:
   a. runtime executables used to start up the program;
   b. library files used in conjunction with the runtime executables;
   c. PDF files used in conjunction with the runtime executables and library files;
   d. a call-up browser functionality used in conjunction with the runtime executables, library files, and PDF files; and
   e. program modules used in conjunction with runtime executables, library files, PDF files, and a call-up browser functionality.

10. The apparatus according to claim 9, wherein the runtime executables comprise executables for running CBT based programs.

11. The apparatus according to claim 9, wherein the library files comprise program files for audio and graphics.

12. The apparatus according to claim 9, wherein the PDF files comprise files for user perusal.

13. The apparatus according to claim 9, wherein the call-up browser functionality comprises a functionality for linking to a designated information site through a data server.

14. The apparatus according to claim 9, wherein the program modules comprise modules each containing an identical yet independent software interface that allow interconnecting to all other program modules.

15. The apparatus according to claim 14, wherein the program modules further comprise:
   a. a jumpFile Authorware function contained in each program module for interconnecting to any other program module employed by choosing a new program module;
   b. a jumpFile link contained in each program module also for interconnecting to any other program module activated by clicking the link; and
   c. a functionality for using predesignated keystrokes, such as ALT tab, contained in each module also for interconnecting to an adjacent program module.

16. The apparatus according to claim 9, wherein the program modules further comprise:
   a. a jumpFile Authorware function contained in each program module for interconnecting to any other program module employed by choosing a new program module;
   b. a jumpFile link contained in each program module also for interconnecting to any other program module activated by clicking the link;
   c. a functionality for using predesignated keystrokes, such as ALT tab, contained in each module also for interconnecting to an adjacent program module; and
   d. modules each containing an identical yet independent software interface that allow interconnecting to all other program modules.

* * * * *

UNITED STATES PATENT AND TRADEMARK OFFICE
CERTIFICATE OF CORRECTION

PATENT NO.    : 6,536,039 B2
DATED         : March 18, 2003
INVENTOR(S)   : Jesse Lon Sanford It is certified that error appears in the above-identified patent and that said Letters Patent is hereby corrected as shown below:

Column 7,
Line 30, replace "placed is into" with -- placed into --.

Signed and Sealed this

Twenty-second Day of July, 2003

JAMES E. ROGAN
*Director of the United States Patent and Trademark Office*